Patented June 10, 1930

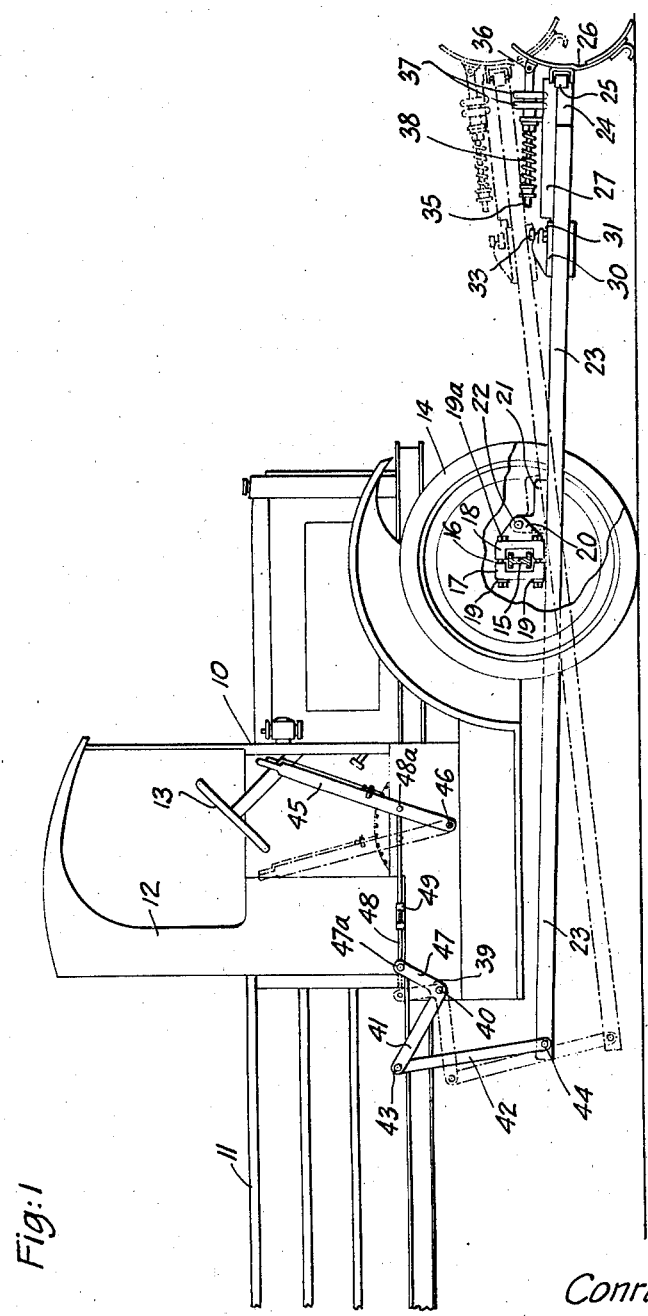

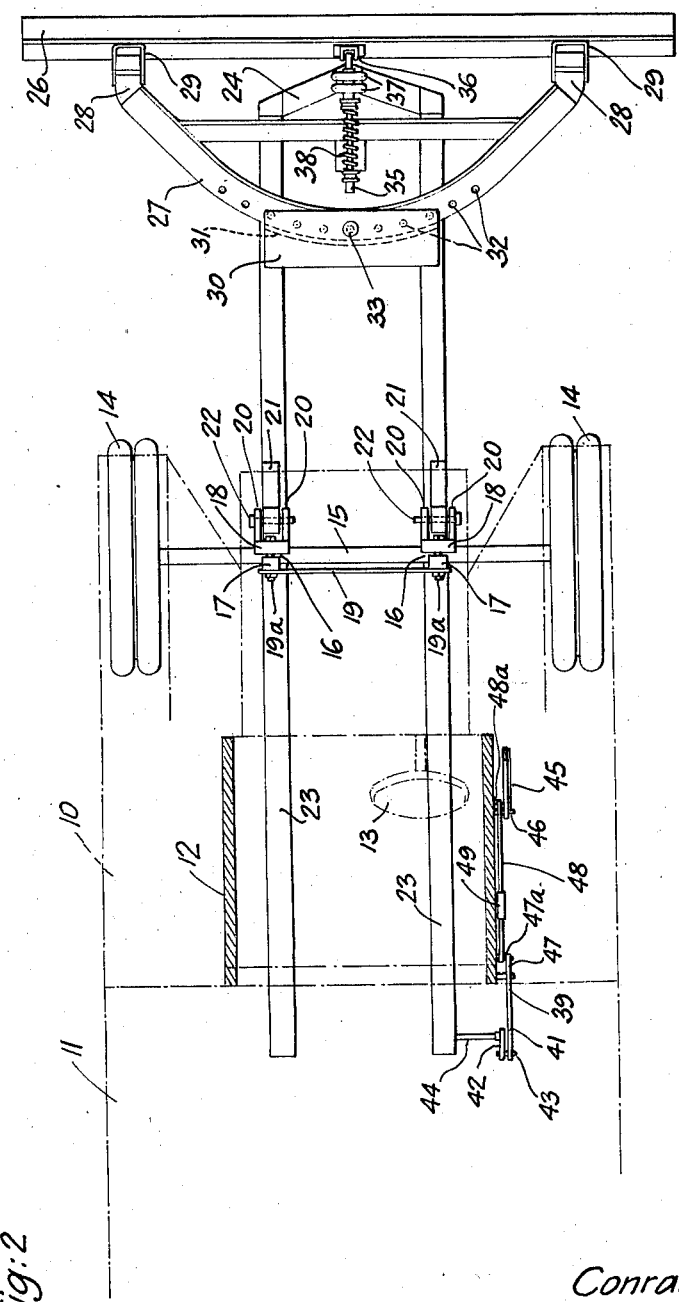

1,763,373

UNITED STATES PATENT OFFICE

CONRAD SCHNELL, OF WOODHAVEN, NEW YORK

SNOWPLOW ATTACHMENT

Application filed November 21, 1927. Serial No. 234,760.

This invention relates to snowplow attachments for motor-driven vehicles.

It is the principal object of the invention to provide an attachment by the use of which the services of one man will be eliminated, the attachment being manipulated by the driver of the vehicle alone.

Another object is to impart to an attachment of this kind a structural rigidity whereby twisting of the device is prevented.

A further object is to make the snowplow easily attachable to the vehicle and easily removable therefrom.

Still other objects will become apparent in the following specification and the accompanying drawings in which a preferred embodiment of my invention is described and shown.

In the drawings,

Fig. 1 is a fragmentary elevational view of the front part of a motor truck showing the snowplow attachment in working position and, in dotted lines, the attachment lifted clear above the street surface. In this figure part of the right hand front wheel is broken away to illustrate the method of fastening the attachment to the front axle of the truck;

Fig. 2 is a plan view of the snow plow attachment fastened to the front axle of the truck, the truck frame or body proper being illustrated in dotted lines.

Like names of reference denote similar parts throughout the several views.

10 is a motor truck having a body 11, a driver's cab 12, steering wheel 13, front wheels 14 and a front axle 15.

16 is an axle clamp near each of the front wheels consisting of a left half 17 and a right half 18. 19 is a bar connecting the two left halves to keep them in alignment. The two halves 17 and 18 are clamped over the front axle 15 by means of bolts 19a as clearly shown in the drawings. Each of the right halves 18 has two frontwardly projecting lugs 20 within which is pivotally secured an L-shaped hinge 21 about a fulcrum pin 22.

23 are two longitudinal beams disposed parallel to each other and each fastened to one of the hinges 21 and extending frontwardly and rearwardly thereof. Beams 23, which are preferably I beams, are joined together at the front by members 24 forming a blunt nose of a substantially U-shaped frame which is securely fastened to both hinges 21, the open end extending rearwardly thereof and the blunt nose connection frontwardly thereof.

Hingedly secured at 25 to the nose formed by members 24 is a scraper bar 26 of arcuate shape. 27 is an arcuate frame having its open ends 28 fastened to the upper part of the scraper bar at 29. 30 is a latch box laid across and fastened to both beams 23, having a slot 31 adapted to receive the curved part of the arcuate frame 27. 32 are a number of holes through frame 27 and 33 is a latch pin through the latch box 30 passing through the holes 32 of the frame 27. By swinging the scraper bar about its pivot 25 laterally, the horizontal position of the scraper bar may be changed and then fixed by dropping the latch pin 33 into the box 30 to engage whatever hole 32 registers with the pin. The vertical angle of the scraper bar 26 may be adjusted by a spindle 35 fastened to the bar at 36, hand wheels 37 and spring 38 which, travelling with the arcuate frame 27 of which they are component parts, by tightening draw the top of the scraper bar to the rear, and by loosening push it to the front. The scraper bar, semi-circular frame, latch box and adjustment member are shown more or less diagrammatically only, being devices well known in the art.

To one of the side walls of the driver's cab 12 is fastened a substantially L-shaped lever 39 upon a pivot 40. The long leg 41 of lever 39 which extends rearwardly is pivoted to one end of a straight lever or link 42 by a pin 43. The other end of link 42 is pivoted to the extreme rear end of beam 23 by means of pivot shaft 44. 45 is an operating lever and latch pin, pivotally secured at its lower end to the side wall of the cab 12 at 46. A short upwardly extending leg 47 of L-shaped lever 39 is pivoted at 47a to a substantially horizontally disposed rod 48 which is pivoted at its other end to the operating lever 45 at 48a at a point above pivot 46. 49 is a turnbuckle in rod 48 for the purpose of adjusting the position of the levers and links just described.

The operation of the device is as follows:

After the snowplow attachment is clamped to the front axle of the truck, as shown, if it is desired to scrape the street, the operating lever 45 is pushed forward to the position shown in Fig. 1. This motion is transmitted from a substantially horizontal one to a substantially vertical movement at the rear end of beams 23 by means of rod 48, lever 39 and link 42. This lifts the rear end of beams 23 upwardly and, the beams being fastened to hinges 21, pivot about pins 22 and force the scraper bar 26 downwardly until it is in the desired position.

To elevate the scraper bar, the operating lever is reversed to the position shown in dotted lines in Fig. 1, when the scraper will be lifted above the street level as also indicated in dotted lines.

It is obvious that the mechanism for elevating or lowering the scraper may be operated by the driver of the truck. This eliminates a second man necessary where the scraper is manipulated by means of a hoist mechanism attached in front of the truck engine. The entire frame is of a simple construction, very rigid, resisting twisting strains, and therefore more durable than former types. I have illustrated the operating mechanism fastened to the rear end of one of the beams 23, but it is obvious that to eliminate undue twisting strains, the pivot shaft 44 may be extended so as to engage the rear end of the second beam 23 also.

While I have shown in the drawings and described in the specification a preferred embodiment of the principles of my invention, I wish it to be understood that various changes of form, proportions, minor details and combination of parts may be resorted to without departing from or sacrificing any of the advantages of the invention, as defined in the appended claims.

What I claim as new, is:

1. A snowplow attachment for motor trucks comprising a frame of substantially U-shape having its legs formed of parallel disposed straight beams tiltably fastened to the front axle of the truck, its closed end extending forward of the axle and its open end rearward thereof, a scraper at the front end and a lever at the driver's seat operably connected to the rear end of the said frame adapted to tilt the frame about its fulcrum.

2. A snowplow attachment for motor trucks comprising a frame of substantially U-shape having its legs formed of parallel disposed straight beams pivotally secured to the front axle of the truck, its closed end extending forward of the axle and its open end rearward thereof, a scraper at the front end and an operating lever at the driver's seat connected by a series of links to the rear end of the said frame adapted to tilt the frame about its pivot, the said scraper being horizontally adjustably mounted upon the said closed end of the frame.

In testimony whereof I have hereunto set my hand.

CONRAD SCHNELL.